Oct. 11, 1966 D. G. KINGSBOROUGH ETAL 3,277,725
METHOD OF AND APPARATUS FOR TESTING RATE GYROS
Filed July 18, 1963
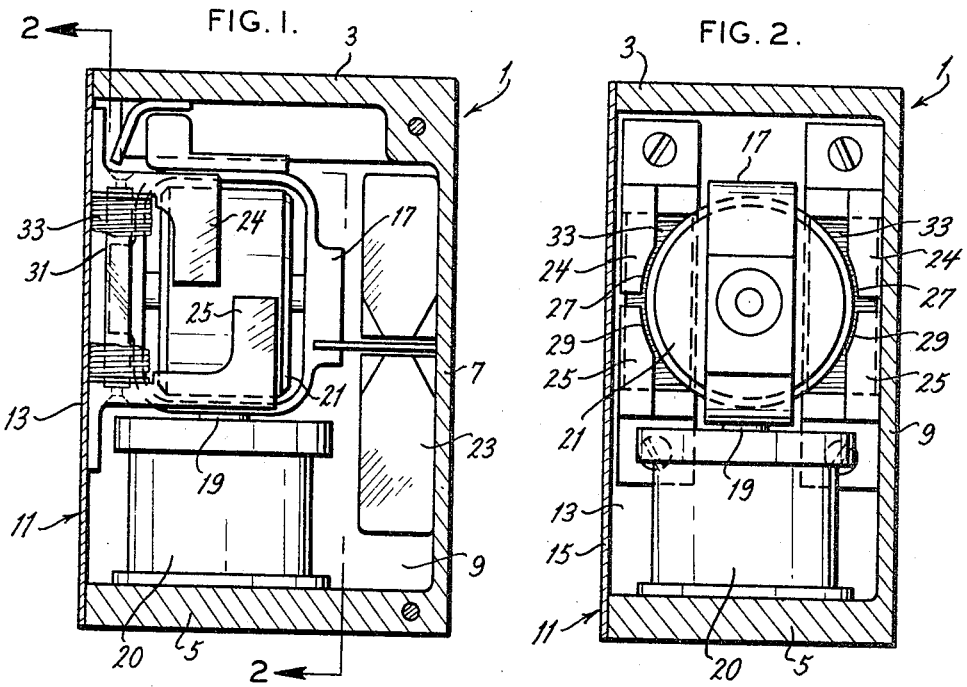
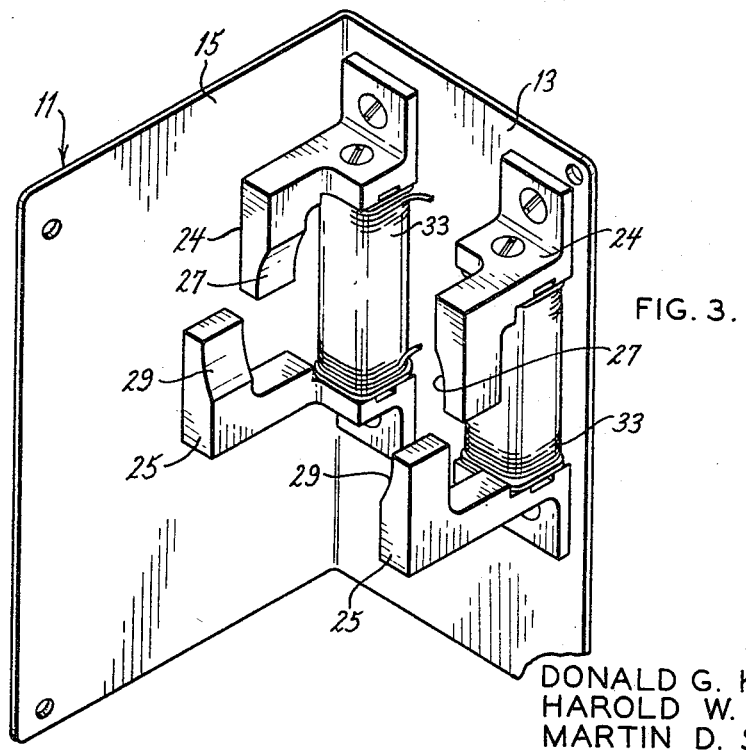
INVENTORS
DONALD G. KINGSBOROUGH
HAROLD W. HOSSFELD
MARTIN D. SETTLES
BY Gravely, Lieder & Woodruff
ATTORNEYS

United States Patent Office 3,277,725
Patented Oct. 11, 1966

3,277,725
METHOD OF AND APPARATUS FOR TESTING RATE GYROS
Donald G. Kingsborough, St. Charles, Harold W. Hossfeld, O'Fallon, and Martin D. Settles, Florissant, Mo., assignors to McDonnell Aircraft Corporation, St. Louis, Mo., a corporation of Maryland
Filed July 18, 1963, Ser. No. 295,922
7 Claims. (Cl. 73—1)

This disclosure is directed to a method of and apparatus for testing a rate gyro, and particularly to a system that permits the test to be conveniently made without removal of the gyro or manipulation of the vehicle in which it is mounted.

Since gyros are utilized in such complex assemblies as auto pilots for aircraft as well as in guided missiles, it is desirable to have some convenient method of determining that the gyro is in condition to perform properly prior to operation of the aircraft, missile or the like. It is important in this connection to determine whether the rotor is running at the correct speed, the gimbal is free, the damping system is not binding, and the output or pickoff is producing a signal. One method for testing a gyro would involve removal of the gyro from the aircraft, missile or other vehicle and submitting it to testing by rotation while monitoring its output from the pickoff device, but it is often highly inconvenient and time consuming to remove a gyro. Another but impractical procedure is to rotate the vehicle in which the gyro is mounted while monitoring output.

The invention herein is useful with original equipment or with equipment which can be modified. In either case the means consists of adding electrical windings and a magnetic circuit to provide a low reluctance magnetic path through the gyro rotor. Exciting the windings with direct current creates a magnetic field in the rotor. Eddy currents induced in the rotor cause a force proportional to speed to be developed when the gyro is running. Thus exciting the winding will cause gimbal deflection and a signal proportional to the deflection can be taken from the output pickoff. The magnetic circuit is balanced so that a gimbal deflection independent of speed does not result when the circuit is energized. The foregoing means makes available a technique or method for conducting operational checks on rate gyros without having to remove the gyro from its position relative to other equipment.

For a relatively long time there has been a need to be able to test the operation and functioning of rate gyros. Generally speaking three in a rate gyro can go bad and heretofore it has been difficult to tell when a gyro is bad without removing it from aircraft or missile and testing on a rate table. The three things that are most likely to go bad in a rate gyro are (1) the rotor which may become inoperative or operate at a wrong speed or direction, (2) the gimbal which may be bound up and yet still produce a reading although a false reading, and (3) the pickoff device, which is attached to the gimbal and produces the output signal. The gimbal may be defective and still be able to produce an output. No simple means is known or available except for the present device, to accurately, reliably and quickly test rate gyros. In fact the only known sure way of making a complete test, other than the present device, is to remove the gyro from its installation and test it on a rate table which is time consuming and impractical as a routine procedure.

The present device overcomes the disadvantages of known gyro test means by providing simple and inexpensive test means which includes mounting two electromagnets inside the gyro housing on opposite sides of the gyro rotor. Each magnet has a C-shaped core with the open ends thereof positioned adjacent to the gyro rotor, and each magnet also has a winding thereon. The windings of the two magnets are connected in series and are energized by applying a predetermined voltage thereacross. When a voltage is thus applied, the magnets establish a field in the gyro rotor which causes the gyro, if working properly, to deflect by an amount proportional to the rotor speed and the applied voltage. The amount of expected deflection is known for each applied voltage and for each speed of the gyro rotor. Therefore, when a test voltage is applied to the magnet windings the operator simply checks the output of the gyro as produced by the gyro pickoff to see what change in output has taken place and if this is the expected change, he can be sure the gyro is operating properly, otherwise not.

The rotor, gimbal and pickoff are all standard components of rate gyros and all operate in their usual way in the present device. These components are usually mounted in a sealed housing and are relatively inaccessible. It is therefore highly desirable to be able to quickly and accurately check the operation of the gyro without having to remove it from aircraft or missile.

Accordingly, a primary object of this disclosure is to provide a simple modification of a rate gyro which will permit testing in situ to enable one quickly to determine that the rotor is running at the proper speed, the gimbal is free and the pickoff device is producing a correct signal.

In attaining these objectives, briefly, a gyro is modified by (or initially constructed with) an electromagnet mounted adjacent the periphery of the gyro rotor, it being understood that the periphery of the rotor will be formed of some non-magnetic conductive material, such as aluminum, brass, copper, and the like. When the electromagnet is energized with a direct current source, a magnetic field is induced within the rotor, and when the rotor is running, the magnetic field induces eddy currents, the effect of which is to produce a drag or load on the rotor, which, in turn, causes the gyro gimbal to deflect a predetermined amount. The amount of deflection is dependent upon the strength of the field and the speed of the rotor, and the pickoff device, if functioning, should produce a signal proportional to the deflection. Accordingly, the gyro may be initially calibrated for a predetermined or known output signal with the electromagnet receiving a predetermined excitation. Whenever the gyro is thereafter tested by exciting the electromagnet with the proper voltage, a failure to produce the predetermined output signal means the gyro has a malfunction.

Other features will be in part apparent and in part pointed out in the following detail description taken in connection with the following drawings, in which:

FIG. 1 is a plan view of the interior of the gyro with an enclosing wall broken away to show the location of an electromagent on one side of the rotor;

FIG. 2 is a sectional view taken along the line 2—2 of FIG. 1; and

FIG. 3 is a greatly enlarged perspective view of the enclosing wall and electromagnets carried thereon.

Referring to the drawings, there is shown a typical rate gyro, such as might be used in aircraft. This disclosure is not intended to be confined to any single type of a gyro, and since gyros are well known in the art, the details of construction are not important other than as background for the modification to which the disclosure is particularly directed.

The gyro shown in the drawings has a main housing 1 with a top wall 3, a bottom wall 5, a side wall 7 (FIG. 1) and an adjacent side wall 9 (FIG. 2). The sides of the housing opposite walls 7 and 9 are open and are adapted to be covered by a removable cover 11 having walls 13 and 15. A gimbal 17 is rotatably supported within the housing for rotation about a vertical axis upon a journal generally designated 19, which also incorporates the device 20 for producing an output signal proportional to the gimbal deflection.

The rotor of the gyro is shown at 21 as journalled within the gimbal. This rotor is of the reversed or inside-out motor type in that a stator (not shown) is contained within the rotor. It will be understood there is some means of driving the rotor of a gyro. A damping system for the gyro is shown at 23 on the right side of FIG. 1, and there may be other mechanism within the housing. The only requirement for the modification to be described is that the rotor or its periphery be formed of a conductive but non-magnetic material, such as aluminum, copper, brass or bronze, so that eddy currents can be induced therein by electromagnets fixed adjacent to the periphery of the rotor. It is important to realize that the method herein does not utilize the principle of precession but rather the eddy current drag which deflects the gimbal against a return spring.

In the embodiment illustrated, there are two electromagnets, one on each side of the rotor. Each magnet has a pair of pole parts or poles 24 and 25 in staggered relationship, so that one pole face 27 is adjacent one end of the rotor while the other pole face 29 is adjacent the other end. The pole face 27 extends downwardly and terminates just above a horizontal plane through the rotor axis, whereas the other pole face 29 extends upwardly and terminates immediately below this plane. In other words, the pole faces are symmetrically disposed in opposite quadrants defined by vertical and horizontal planes through the center of the rotor. The pole faces are slightly concave or conform with the rotor periphery and are spaced from the rotor an amount sufficient to avoid mechanical interference with normal movement of the rotor or gimbal.

The two pole parts 24 and 25 of an electromagnet are secured, as by screws, upon opposite ends of a core member 31, which carries a winding 33. The core 31 and its winding are located to one side clear of the rotor, and the poles may have feet resting against and secured by screws to the side wall 13 of the cover 11.

Although only one electromagnet is shown in FIG. 1, it can be seen in FIGS. 2 and 3 that there would be identical electromagnets on opposite sides of the rotor for purposes of symmetry. It will be further understood that the configuration of the electromagnets might be varied to fit the particular preexisting gyro to be modified by addition of this testing apparatus. In designing a new gyro, the electromagnets would be more readily incorporated from the beginning.

The operation of the testing apparatus will involve connecting the windings of the two electromagnets (in series or parallel) to a suitable direct current source of electric energy while the rotor is driven, or connected to be driven at its normal speed. If the rotor is running properly, eddy currents will be induced within its periphery by the magnetic poles, and develop a braking action, which, in turn, will cause the gimbal to deflect on its axis. Movement of the gimbal will cause a signal change at the pickoff, thereby indicating proper operation of the gyro. If the rotor is not running or if the gimbal is stuck, or if the output device is not energized or not providing an output, no signal will result, thereby indicating a malfunction of the gyro.

It is also possible to test for less obvious malfunctions, such as a failure of the rotor to run at its proper speed, a slight undesired restraining action or gimbal movement or an output signal that is not truly a measure of the gimbal deflection. This is done by first ascertaining that the gyro is functioning properly and then applying a predetermined direct current excitation to the electromagnets. The resulting output or pickoff signal for this excitation is recorded. Thereafter, whenever it is desired to test the gyro, the same excitation (direct current voltage) is applied to the electromagnets, and the resulting output signal is compared against the one previously obtained and recorded.

From the foregoing, it will be readily apparent to those skilled in the art that the apparatus disclosed accomplishes the results intended. Although only one embodiment is described in detail, it will be understood that various changes can be made without departing from the spirit of this disclosure, or the scope thereof as set forth in the following claims.

What is claimed is:

1. In a gyro of the type having a rotor with a conductive periphery, a gimbal, and a pickoff device for producing an electric output signal responsive to movement of the gimbal, the improvement that comprises an electromagnet having a pair of poles disposed adjacent the rotor periphery so as to induce eddy currents therein upon rotation of the rotor, said poles having pole faces disposed in opposite quadrants defined by perpendicular planes extending through the center of the rotor, one of which planes passes through the rotor axis.

2. In the gyro as set forth in claim 1 the improvement further comprising a second electromagnet similar in construction to the aforesaid electromagnet but having its poles disposed substantially on opposite sides of the rotor from the poles of the aforesaid electromagnet.

3. In a gyro structure including a substantially cylindrical rotor including a body having a conductive layer on the cylindrical outer surface thereof, a gimbal, and pickoff means for producing an electric output signal responsive to movements of the gimbal, the improvement comprising electromagnetic means including a magnetic core having spaced pole portions, means for mounting the electromagnetic means with the pole portions positioned adjacent to the conductive rotor layer at locations spaced axially and circumferentially relative thereto, means for energizing said electromagnetic means to generate a magnetic field in the rotor which induces eddy currents to flow in the conductive rotor layer during rotation of the rotor, said induced eddy currents producing drag force on the rotor and deflection of the gimbal.

4. A method of testing a gyro of a type having a rotor journaled in the gimbal and means connected to the gimbal for producing output signals in response to gimbal movements, said rotor having a body portion with an outer conductive layer, the method comprising the steps of positioning an electromagnetic device having a magnetizable core with a pair of spaced end portions adjacent to the conductive outer rotor layer so that the end portions are positioned at locations spaced axially and circumferentially relative to the rotor, energizing the electromagnetic device to establish a magnetic field in the rotor whereby the field induces eddy currents to flow in the conductive rotor layer when the rotor is rotating to produce drag on the rotor and deflection of the gimbal, and detecting the output signals produced by movements of the gimbal for various energized conditions of the electromagnetic device.

5. The method of claim 4 including the steps of comparing the detected outputs corresponding to gimbal movements for various energized conditions of the electromagnetic device with gimbal movements under known test conditions.

6. Means for testing a gyro to see if it is operating properly comprising a rate gyro having a rotor of generally cylindrical construction, said rotor including a surface layer of conductive material, means for inducing eddy currents to flow in the conductive surface layer during rotor rotation including an electromagnetic member having a magnetizable core including a central portion with a winding thereon and a pair of spaced end portions, means for mounting the electromagnetic member with the core end portions positioned adjacent to the conductive rotor layer at positions spaced axially and circumferentially relative thereto, means including a source of D.C. potential connected to the core winding for energizing said electromagnetic member to produce a magnetic field in the rotor which field induces eddy currents to flow in the conductive layer during rotation of the rotor, said induced eddy currents producing drag on the rotor and deflection of the gimbal, and means responsive to gimbal deflection for producing output indications thereof.

7. The means for testing a gyro defined in claim 6 wherein a pair of similar electromagnetic members are mounted substantially on opposite sides of the rotor.

References Cited by the Examiner

UNITED STATES PATENTS

| | | | |
|---|---|---|---|
| 2,417,689 | 3/1947 | Johnson | 74—5.4 |
| 2,835,131 | 5/1958 | Vacquier et al. | 33—236 X |
| 3,058,357 | 10/1962 | Fischel | 74—5.4 |
| 3,077,760 | 2/1963 | Packard | 73—1 |
| 3,186,211 | 6/1965 | Reed et al. | 73—1 |

LOUIS R. PRINCE, *Primary Examiner*

S. C. SWISHER, *Assistant Examiner.*